United States Patent
Ohkawa et al.

(10) Patent No.: US 10,804,722 B2
(45) Date of Patent: Oct. 13, 2020

(54) BATTERY CONTROL DEVICE

(71) Applicant: HITACHI AUTOMOTIVE SYSTEMS, LTD., Ibaraki (JP)

(72) Inventors: Keiichiro Ohkawa, Hitachinaka (JP); Yoshinori Aoshima, Hitachinaka (JP)

(73) Assignee: VEHICLE ENERGY JAPAN, INC., Ibaraki (JP)

( * ) Notice: Subject to any disclaimer, the term of this patent is extended or adjusted under 35 U.S.C. 154(b) by 48 days.

(21) Appl. No.: 16/071,960

(22) PCT Filed: Dec. 22, 2016

(86) PCT No.: PCT/JP2016/088270
§ 371 (c)(1),
(2) Date: Jul. 23, 2018

(87) PCT Pub. No.: WO2017/130614
PCT Pub. Date: Aug. 3, 2017

(65) Prior Publication Data
US 2019/0067954 A1 Feb. 28, 2019

(30) Foreign Application Priority Data
Jan. 27, 2016 (JP) ................. 2016-012936

(51) Int. Cl.
*H02J 7/00* (2006.01)
*B60L 53/00* (2019.01)
(Continued)

(52) U.S. Cl.
CPC .............. *H02J 7/007* (2013.01); *B60L 53/00* (2019.02); *B60L 58/12* (2019.02);
(Continued)

(58) Field of Classification Search
CPC ....................................................... H02J 7/007
USPC ........................................................ 320/134
See application file for complete search history.

(56) References Cited

U.S. PATENT DOCUMENTS

2009/0256521 A1\* 10/2009 Mori ...................... H02J 7/0047
320/108
2014/0111164 A1 4/2014 Ohkawa et al.
(Continued)

FOREIGN PATENT DOCUMENTS

EP 1353191 A2 10/2003
EP 2720343 A1 4/2014
(Continued)

OTHER PUBLICATIONS

Extended European Search Report dated Sep. 4, 2019 for the European Patent Application No. 16888198.5.
(Continued)

*Primary Examiner* — Jerry D Robbins
(74) *Attorney, Agent, or Firm* — Volpe and Koenig, P.C.

(57) ABSTRACT

An object of the present invention is to provide a control device and a control method for a storage battery, which calculates an appropriate maximum allowable input/output power that suppresses deterioration of the storage battery while suppressing deterioration of power performance of a vehicle when a current is continuously charged or discharged.
When it is detected that charging or discharging is continuously performed over a predetermined duration time with respect to the maximum allowable charge power and the maximum allowable discharge power which can be input and output during the calculated predetermined duration time, the value of the maximum allowable charge power or the maximum allowable discharge power communicated to a vehicle controller on the basis of the state of charge or discharge is reduced based on the time during which charging or discharging is actually continued.

7 Claims, 11 Drawing Sheets

(51) Int. Cl.
  *B60L 58/12* (2019.01)
  *H01M 10/48* (2006.01)
  *H01M 10/42* (2006.01)
  *H01M 10/44* (2006.01)
  *B60L 50/50* (2019.01)
  *B60K 6/28* (2007.10)

(52) U.S. Cl.
  CPC ....... *H01M 10/425* (2013.01); *H01M 10/441* (2013.01); *H01M 10/48* (2013.01); *H02J 7/00* (2013.01); *B60K 6/28* (2013.01); *B60L 50/50* (2019.02); *B60Y 2200/91* (2013.01); *B60Y 2200/92* (2013.01); *B60Y 2300/91* (2013.01); *H01M 10/443* (2013.01); *Y02T 10/7005* (2013.01); *Y02T 10/7241* (2013.01)

(56) References Cited

U.S. PATENT DOCUMENTS

2015/0108991 A1  4/2015  Aoshima et al.
2015/0291044 A1  10/2015  Adachi et al.
2016/0137186 A1*  5/2016  Ishishita ................ B60L 58/12
    701/22

FOREIGN PATENT DOCUMENTS

| JP | 2014-113006 A | 6/2014 |
| JP | 5715694 B2 | 5/2015 |
| JP | 2015-208061 A | 11/2015 |
| WO | 2012/169063 A1 | 12/2012 |
| WO | 2013/175606 A1 | 11/2013 |
| WO | 2014/087580 A1 | 6/2014 |

OTHER PUBLICATIONS

International Search Report dated Feb. 21, 2017 of the PCT International Application No. PCT/JP2016/088270.
Japanese Office Action dated Sep. 18, 2018 for the Japanese Patent Application No. 2017-563745.

* cited by examiner

BATTERY CONTROL DEVICE

TECHNICAL FIELD

The present invention relates to a technique for controlling a battery.

BACKGROUND ART

Storage batteries such as lead batteries, nickel-hydrogen batteries, lithium ion batteries are mounted on vehicles running using electricity as power. Electric power required for running a hybrid car or an electric car is covered by these storage batteries.

The storage batteries mounted on vehicles are used in a wide temperature range and have the maximum allowable power according to the temperature. When the storage battery is charged and discharged beyond this maximum allowable power, there is a possibility of overcharge or overdischarge.

Generally, the maximum allowable power of a storage battery in a low temperature state is small, and the maximum allowable power of a storage battery in a high temperature state is large. Further, although the maximum allowable power is large in a high temperature state, the use of a storage battery in the high temperature state accelerates deterioration of the storage battery. On the other hand, when the state of charge (SOC) of a storage battery is high, the maximum allowable charge power is small, and the maximum allowable discharge power is large.

Further, when the SOC of a storage battery is low, the maximum allowable discharge power is small, and the maximum allowable charge power is large. To safely use a storage battery, it is necessary to perform charge/discharge control within a range not exceeding the maximum allowable power.

JP 5715694 B2 (PTL 1) describes a technique capable of determining an allowable charge/discharge power that corresponds to a change in internal resistance of a storage battery in accordance with a duration time of charging and discharging.

The battery control device according to this publication has an internal resistance table in which an internal resistance value according to the temperature and state of charge of a unit cell is described for each duration time value of charging or discharging of the unit cell. The battery control device calculates the maximum allowable charge current or the maximum allowable discharge current of a unit cell using the internal resistance value described in the internal resistance table and controls charging or discharging of the unit cells by using the maximum allowable charge power or the maximum allowable discharge power calculated according to the calculated value.

Therefore, even if internal resistance of the unit cell changes by continuously charging or discharging, it is possible to follow the change in the internal resistance by switching the internal resistance value obtained from the internal resistance table according to the change. As a result, the allowable charge/discharge power can be accurately obtained.

CITATION LIST

Patent Literature

PTL 1: JP 5715694 B2

SUMMARY OF INVENTION

Technical Problem

Information on the maximum allowable charge power and the maximum allowable discharge power calculated by a battery control device is sent to a vehicle controller at any time through a communication network such as a controller area network (CAN). According to the method described in PTL 1, the maximum allowable charge power and the maximum allowable discharge power are calculated using an internal resistance table described for each duration time value of charging or discharging. However, the maximum allowable charge power and the maximum allowable discharge power are information that prescribes the maximum allowable power that can be input and output during a predetermined duration time from a stationary state without input/output in a storage battery.

The vehicle controller performs driving control of a vehicle while referring to these pieces of information. In the actual operating environment of a vehicle, not only the charging and discharging from the stationary state without input and output but also many dynamic states in which charging and discharging are continuously performed exist. In the use of such a storage battery in the dynamic state, in the case where the actual charging or discharging of the storage battery is sufficiently smaller than the maximum allowable charge power or the maximum allowable discharge power, there is almost no influence on the life of the storage battery and the like. However, in the case where input/output is performed at a level close to the upper limit even though not exceeding the maximum allowable power, there is a case where overvoltage or overdischarge of the storage battery occurs, and the storage battery is overloaded and adversely affects the life and the like.

The present invention has been made to solve the above problems, and it is an object of the present invention to provide a control device and a control method for a storage battery that calculates an appropriate maximum allowable input/output power for suppressing deterioration of the storage battery when a large current is continuously charged or discharged.

Solution to Problem

When it is detected that charging or discharging is continuously performed over a predetermined duration time with respect to the maximum allowable charge power and the maximum allowable discharge power which can be input and output during the calculated predetermined duration time, the value of the maximum allowable charge power or the maximum allowable discharge power communicated to the vehicle controller on the basis of the state of charge or discharge is reduced based on the time during which charging or discharging is actually continued.

Advantageous Effects of Invention

According to the present invention, more appropriate maximum allowable power can be reported to a vehicle controller, such that it is possible to reduce the frequency of an excessive load and to suppress deterioration of the storage battery.

Issues, configurations, and effects other than the above are clarified by descriptions of the following embodiments.

DESCRIPTION OF EMBODIMENTS

Hereinafter, embodiments of the present invention will be described with reference to the drawings. In the following embodiments, the case where the present invention is applied to a battery system included in a power source of a plug-in hybrid vehicle (PHEV) will be described as an example. It should be noted that the present invention is not limited to the PHEV and can be applied to an electric vehicle to which a storage battery is applied such as a hybrid vehicle (HEV) or an electric vehicle (EV).

In addition, in the following embodiments, the case where a lithium ion battery is used will be described as an example. However, a nickel-hydrogen battery, a lead battery, an electric double layer capacitor, a hybrid capacitor, and the like can also be used. In the following embodiments, unit cells are connected in series to constitute a battery pack, but it is also possible to constitute the battery pack by connecting in series the unit cells connected in parallel or by connecting in parallel the unit cells connected in series.

First Embodiment

Figure 1:
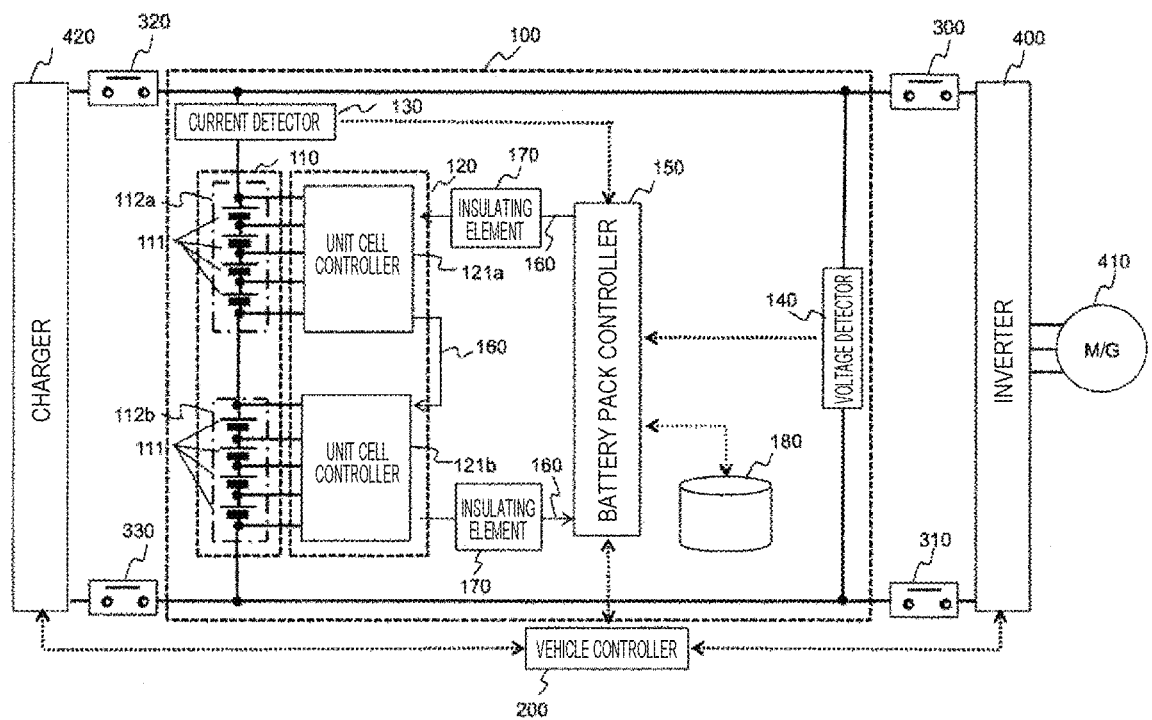
FIG. 1 indicates a configuration of a battery system 100 and its surroundings.

FIG. 1 is a view indicating a configuration of the battery system 100 and its surroundings according to the present embodiment. The battery system 100 is connected to an inverter 400 via relays 300 and 310 and is connected to a charger 420 via relays 320 and 330. The battery system 100 includes a battery pack 110, a unit cell management unit 120, a current detector 130, a voltage detector 140, a battery pack controller 150, and a storage unit 180.

The battery pack 110 is composed of a plurality of the unit cells 111. The unit cell management unit 120 monitors a state of the unit cells 111. The current detector 130 detects a current flowing in the battery system 100. The voltage detector 140 detects the total voltage of the battery pack 110. The battery pack controller 150 controls the battery pack 110.

The battery pack controller 150 receives a battery voltage and temperature of the unit cell 111 transmitted by the unit cell management unit 120, a value of current flowing in the battery system 100 transmitted by the current detector 130, and the total voltage value of the battery pack 110 transmitted by the voltage detector 140. The battery pack controller 150 detects a state of the battery pack 110 based on the received information. The result of the state detection by the battery pack controller 150 is transmitted to the unit cell management unit 120 and the vehicle controller 200.

In the battery pack 110, a plurality of the unit cells 111 capable of storing and releasing electrical energy (charging and discharging of DC power) is electrically connected in series. The unit cells 111 constituting the battery pack 110 are grouped into a predetermined number of units to manage and control the states. The grouped unit cells 111 are electrically connected in series to form unit cell groups 112a and 112b. The number of the unit cells 111 included in the unit cell groups 112a and 112b may be the same in all the unit cell groups 112, or the number of the unit cells 111 may be different for each of the unit cell groups 112a and 112b.

The unit cell management unit 120 monitors the state of the unit cells 111 constituting the battery pack 110. The unit cell management unit 120 includes the unit cell controller 121 provided for each unit cell group 112. In FIG. 1, unit cell controllers 121a and 121b are provided corresponding to the unit cell groups 112a and 112b. The unit cell controllers 121a and 121b monitor and control a state of the unit cells 111 included in the unit cell group 112.

In the first embodiment, to simplify the explanation, it is assumed that four unit cells 111 are electrically connected in series to form the unit cell groups 112a and 112b, and the unit cell groups 112a and 112b are further electrically connected in series to form the battery pack 110 having total eight unit cells 111.

The battery pack controller 150 and the unit cell management unit 120 transmit and receive signals via an insulating element 170 represented by a photo coupler and a signal communication unit 160.

A communication unit between the battery pack controller 150 and the unit cell controllers 121a and 121b constituting the unit cell management unit 120 will be described. The unit cell controllers 121a and 121b are connected in series in descending order of potential of the unit cell groups 112a and 112b monitored by the unit cell controllers 121a and 121b respectively. A signal transmitted from the battery pack controller 150 to the unit cell management unit 120 is input to the unit cell controller 121a via the insulating element 170 and the signal communication unit 160. The output of the unit cell controller 121a is input to the unit cell controller 121b via the signal communication unit 160, and the output of the lowest unit cell controller 121b is transmitted to the battery pack controller 150 via the insulating element 170 and the signal communication unit 160. In the first embodiment, signals are not transmitted and received between the unit cell controller 121a and the unit cell controller 121b via the insulating element 170, but the signals can also be transmitted and received via the insulating element 170.

The storage unit 180 stores the internal resistance characteristics of the battery pack 110, the unit cell 111, the unit cell groups 112a and 112b, the capacity at the time of full charge, the polarization voltage, the deterioration characteristic, the individual difference information, and information on the correspondence relation between SOC and an open circuit voltage (OCV) and the like. Furthermore, it is also possible to preliminarily store the characteristic information of the unit cell management unit 120, the unit cell controllers 121a and 121b, the battery pack controller 150, and the like. The information stored in the storage unit 180 will be described again with reference to FIGS. 3 and 4 to be described later.

Using the information received from the unit cell management unit 120, the current detector 130, the voltage detector 140, and the vehicle controller 200 and a SOC table 181 and an internal resistance table 182 to be described later, the battery pack controller 150 calculates to control SOC and a state of health (SOH) of one or more unit cells 111, chargeable/dischargeable current and electric power (hereinafter, the charging side is expressed as a positive value and the discharging side is expressed as a negative value), an abnormal state, and a charge/discharge amount. Then, based on the calculation result, the information is output to the unit cell management unit 120 and the vehicle controller 200.

The vehicle controller 200 controls the inverter 400 connected to the battery system 100 via the relays 300 and 310 by using the information transmitted by the battery pack controller 150. Further, the vehicle controller 200 controls the charger 420 connected to the battery system 100 via the relays 320 and 330. While a vehicle is traveling, the battery system 100 is connected to the inverter 400 and drives a motor generator 410 using the energy stored in the battery pack 110. At the time of charging, the battery system 100 is connected to the charger 420 and is charged by power supply from a household power source or a charging station.

The charger 420 is used to charge the battery pack 110 using an external power source such as a household power source or a charging station. In the first embodiment, the charger 420 controls a charging voltage, a charge current, and like based on a command from the vehicle controller 200. However, the charger 420 may perform control based on a command from the battery pack controller 150. Further, the charger 420 may be disposed inside a vehicle according to the configuration of a vehicle, the performance of the charger 420, the purpose of use, arrangement conditions of the external power source, and the like or may be disposed outside the vehicle.

When the vehicle system mounted with the battery system 100 starts and travels, under the control of the vehicle controller 200, the battery system 100 is connected to the inverter 400, and the motor generator 410 is driven using energy stored in the battery pack 110. During regeneration, the battery pack 110 is charged by the generated power of the motor generator 410. When the vehicle provided with the battery system 100 is connected to an external power source represented by a household power source or a charging station, based on information sent from the vehicle controller 200, the battery system 100 and the charger 420 are connected, and the battery pack 110 is charged until the predetermined condition is satisfied. The energy stored in the battery pack 110 by charging is used at the time of the next traveling of a vehicle, or it is also used for operating electrical components inside and outside the vehicle and the like. Further, if necessary, the energy may also be discharged to an external power source represented by a household power source.

Figure 2:
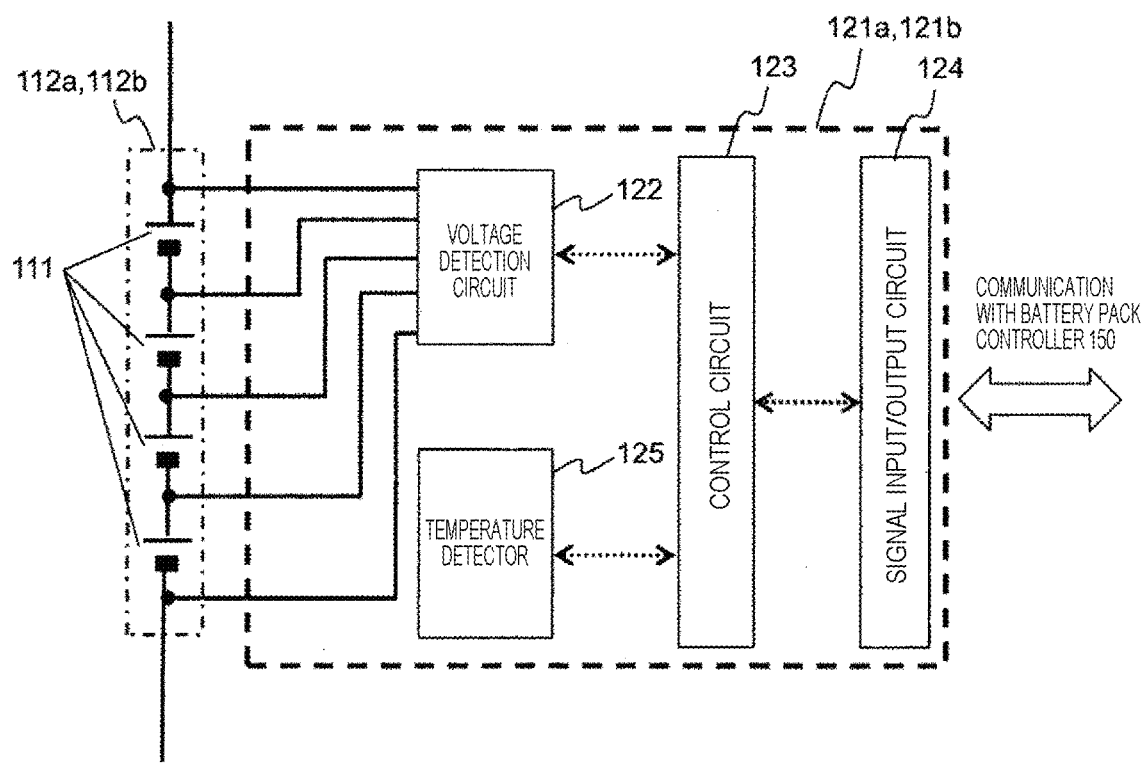
FIG. 2 indicates a circuit configuration of a unit cell controller 121.

FIG. 2 is a diagram indicating a circuit configuration of the unit cell controllers 121a and 121b. The unit cell controllers 121a and 121b include a voltage detection circuit 122, a control circuit 123, a signal input/output circuit 124, and a temperature detector 125. The voltage detection circuit 122 measures an inter-terminal voltage of each unit cell 111. The control circuit 123 receives a measurement result from the voltage detection circuit 122 and the temperature detector 125 and transmits the measurement result to the battery pack controller 150 illustrated in FIG. 1 via the signal input/output circuit 124. It is determined that the configuration of a circuit which is generally mounted on the unit cell controllers 121a and 121b and equalizes the voltage and SOC variation between the unit cells 111 generated due to self-discharge, variations in current consumption, and the like is well-known, and therefore description thereof is omitted.

The temperature detector 125 included in the unit cell controllers 121a and 121b in FIG. 2 has a function of measuring the temperature of the unit cell group 112. The temperature detector 125 measures one temperature as a whole of the unit cell groups 112a and 112b and treats the temperature as a representative temperature value of the unit cells 111 included in the unit cell groups 112a and 112b. The temperature measured by the temperature detector 125 is used for various calculations for detecting a state of the unit cell 111, the unit cell groups 112a and 112b, or the battery pack 110. In FIG. 2 assuming the above, one temperature detector 125 is provided for each of the unit cell controllers 121a and 121b. The temperature detector 125 may be provided for each unit cell 111 to measure the temperature for each unit cell 111. Various calculations may be executed based on the temperature of each unit cell 111. In this case, the number of the temperature detectors 125 increases, and therefore the configuration of the unit cell controllers 121a and 121b becomes complicated.

In FIG. 2, the temperature detector 125 is simply indicated. Actually, a temperature sensor is disposed in the target of temperature measurement. The disposed temperature sensor outputs temperature information as a voltage. The measurement result is transmitted to the signal input/output circuit 124 via the control circuit 123. The signal input/output circuit 124 outputs the measurement result to the outside of the unit cell controllers 121a and 121b. A function for realizing this series of flow is mounted as a temperature detector 125 in the unit cell controllers 121a and 121b, and the voltage detection circuit 122 can also be used for measuring the temperature information (voltage).

Figure 3:
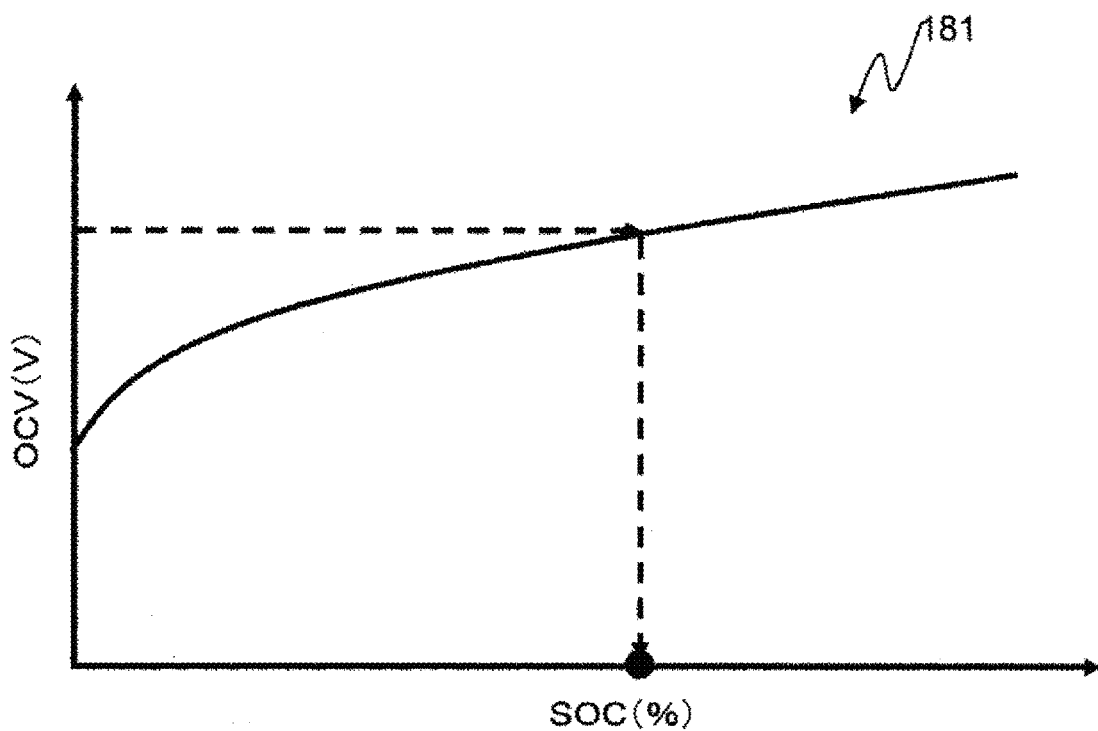
FIG. 3 indicates an example of a SOC table 181 stored in a storage unit 180.

FIG. 3 is a diagram indicating an example of the SOC table 181 stored in the storage unit 180. The SOC table 181 is a data table describing the correspondence relation between the OCV of the unit cell 111 and the SOC of the unit cell 111. The data format may be arbitrary, but for convenience of explanation here, examples of data are indicated in a graph. Although the data table is used in this embodiment, it is also possible to express the correspondence relation between the OCV and the SOC by using such as mathematical expressions. Any means can be used as long as it is characteristic information indicating the correspondence relation between the OCV and the SOC, and it can convert from the OCV to the SOC or from the SOC to the OCV.

The OCV is a voltage at the time of no load of the unit cell 111. It can be determined that an inter-terminal voltage of the unit cell 111 is the OCV when the inter-terminal voltage is measured at the timing of before the relays 300, 310, 320, and 330 indicated in FIG. 1 are closed or in a state in which charging and discharging of the battery pack 110 are not started although the relays 300, 310, 320, and 330 are closed.

Furthermore, although the battery pack 110 is charged or discharged, it can also be regarded as OCV when the current value is weak.

When the current value input and output to the unit cell 111 is large, the internal resistance included in the unit cell 111 causes a voltage drop and voltage rise which cannot be ignored. The battery voltage at this time is a closed circuit voltage (CCV), and it is difficult for the unit cell controllers 121a and 121b to directly grasp the OCV of the unit cell 111 under this condition. To obtain the OCV in this case, the battery pack controller 150 needs to calculate the OCV according to the following equation 1 by using the CCV of the unit cell 111 measured by the unit cell controllers 121a and 121b, a current I flowing in and out of the unit cell 111 measured by the current detector 130, an internal resistance R of the unit cell 111 stored in advance, and information on a polarization voltage Vp. By inputting the obtained OCV to the table of FIG. 3, the SOC at each time point is obtained.

$$OCV = CCV - I \times R - Vp \quad \text{(Equation 1)}$$

The calculation of equation 1 can be executed by the battery pack controller 150 irrespective of whether the unit cell 111 is charged or discharged. The SOC is calculated for each unit cell 111, for example, by using the OCV of each of the unit cells 111 constituting the battery pack 110.

As another method of calculating the SOC, a method of obtaining the SOC by integrating the current flowing in and out of the unit cell 111 is known (SOC=initial SOC+100×∫Idt/full charge capacity). In this embodiment, either SOC calculation method may be adopted. Further, another method may be used by which the battery pack controller 150 can obtain the SOC for each unit cell 111.

To obtain the SOC for each unit cell 111, it is necessary to set the initial SOC and a full-charge capacity for each unit cell 111 as a calculation parameter in the case of adopting the SOC calculation method of obtaining SOC by integrating CCV, R, and Vp of Equation 1 and the above-described current.

The battery pack controller 150 can obtain the SOC of the unit cell 111 by using the OCV of the unit cell 111 and the SOC table 181 detected by the unit cell controllers 121a and 121b. It is also possible to calculate the OCV of the battery pack 110 by totaling the OCV of the unit cell 111. When the SOC characteristics are different for each unit cell 111, the SOC table 181 may be provided for each unit cell 111.

Figure 4:
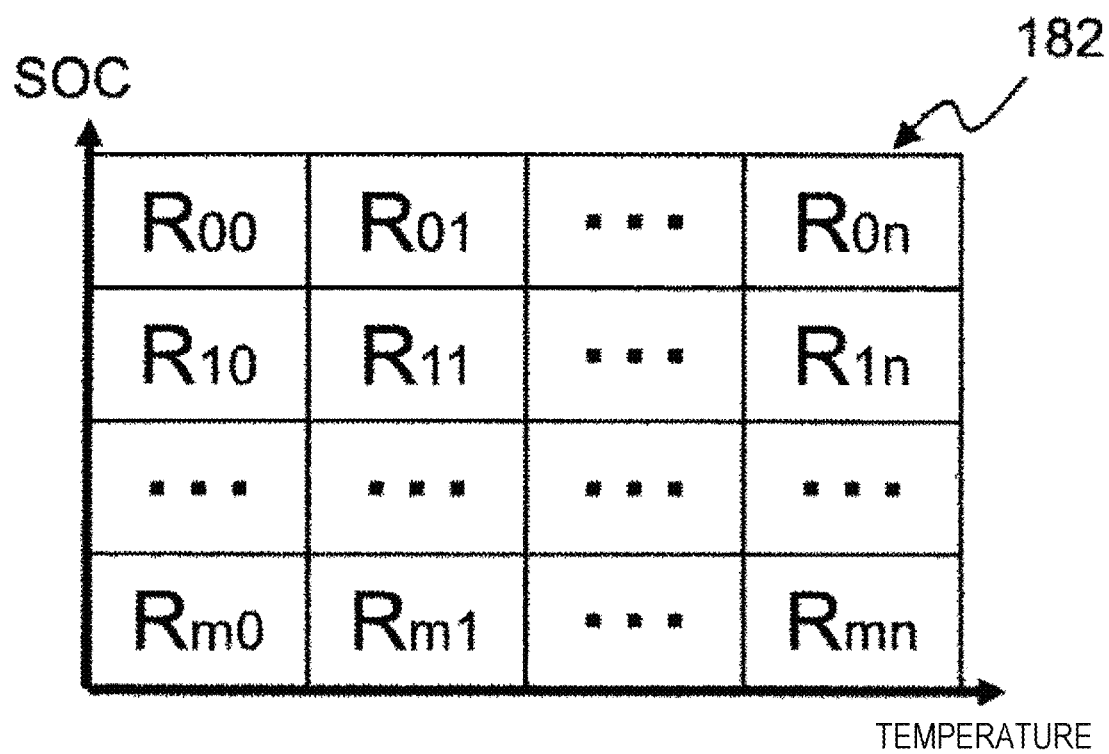
FIG. 4 indicates an example of an internal resistance table 182 stored in the storage unit 180.

FIG. 4 is a diagram indicating an example of the internal resistance table 182 at the time of charging, which is stored in the storage unit 180. The internal resistance table 182 is a data table describing the internal resistance value according to the temperature and the SOC of the unit cell 111 in a predetermined charging duration time tc (assumed to be ten seconds in this case). The data format of the internal resistance table 182 may be arbitrary. For convenience of explanation, a two-dimensional map is exemplified in which the horizontal axis represents the temperature of the unit cell 111, and the vertical axis represents the internal resistance value R of the unit cell 111 as the SOC of the unit cell 111. In the present embodiment, the data table is used. However, similarly to the SOC table 181 of FIG. 3, correspondence relation among temperature, SOC, and internal resistance at a charging duration time by a different means from a data table such as an equation may be expressed. It may be any characteristic information of temperature, SOC, and internal resistance at a certain charging duration time.

The battery pack controller 150 refers to the internal resistance table 182 by using the SOC acquired by the above method and the representative temperature of the unit cell groups 112a and 112b acquired by the unit cell controllers 121a and 121b to acquire the internal resistance value of the unit cell 111. Further, by designating the charging duration time of the unit cell 111, it is possible to acquire the internal resistance value for each charging duration time.

Although illustration and detailed description are omitted, in general, since the internal resistance at the time of charging is different from that at the time of discharging, the internal resistance table describing the internal resistance value corresponding to the SOC and the temperature of the unit cell 111 at a predetermined discharging duration time td (here assumed to be ten seconds) at the time of discharging is held in the storage unit 180.

In this example, the case where the charging duration time tc and the discharging duration time td are in only one time condition is exemplified. However, even if a plurality of conditions (for example, five seconds, ten seconds, fifteen seconds, and the like) may be stored in the storage unit 180. Since the internal resistance value varies according to the charging duration time tc and the discharging duration time td, the maximum allowable charge power or the maximum allowable discharge power under a plurality of duration time conditions may be reported depending on the processing method applied by the vehicle controller 200.

The configuration of the battery system 100 has been described above. Next, a basic concept and operation procedure of the operation of the battery system 100 will be described.

An internal resistance value of the unit cell 111 varies according to the temperature and the SOC of the unit cell 111. The temperature of the unit cell 111 can be acquired from the unit cell controllers 121a and 121b, and the SOC of the unit cell 111 can be acquired using the above-described method. The battery pack controller 150 acquires the internal resistance value of the unit cell 111 by referring to the internal resistance table 182 from the acquired temperature and SOC and determines appropriate allowable charge power and allowable discharge power.

In the present embodiment, the allowable charge power and the allowable discharge power obtained based on the internal resistance table 182 are further corrected based on the current value and the duration time.

Figure 5:
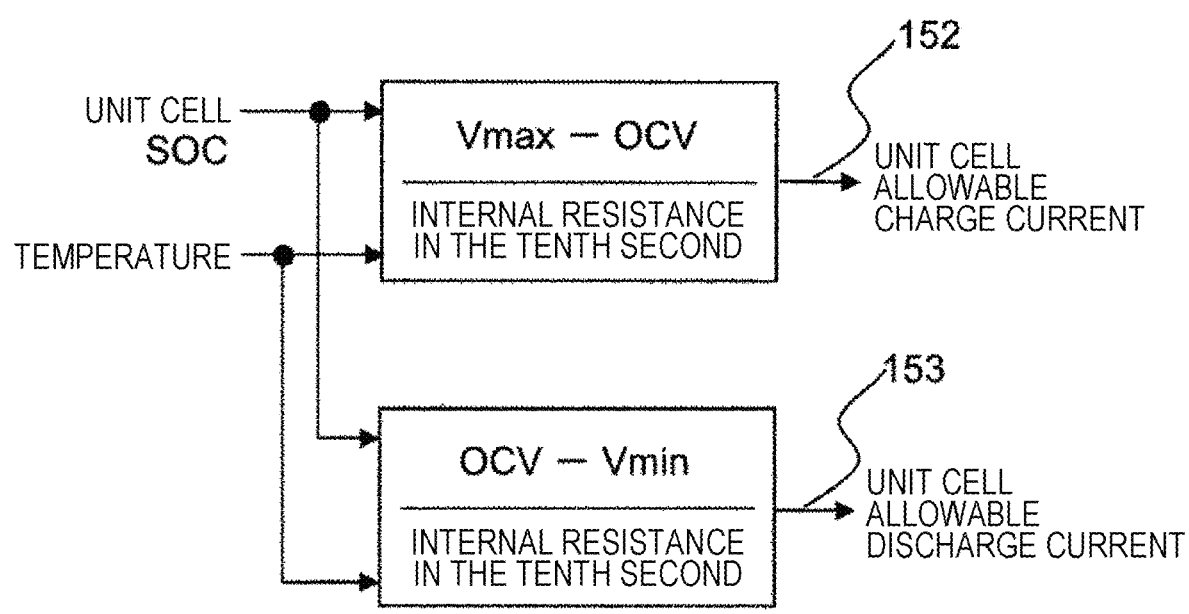
FIG. 5 indicates a control block representing a method of obtaining an allowable discharge current of each unit cell 111 of a battery pack controller 150 included in the battery system 100.

FIG. 5 is a diagram indicating, by a control block, a method of obtaining the unit cell allowable charge current 152 and the unit cell allowable discharge current 153 of each unit cell 111 of the battery pack controller 150 included in the battery system 100. When the allowable maximum terminal current of the unit cell 111 is denoted by Vmax, and the allowable minimum terminal voltage is denoted by Vmin, the unit cell allowable charge current 152 can be obtained by the following equation 2, and the unit cell allowable discharge current 153 can be obtained by the following equation 3. The OCV of equation 2 and equation 3 can use the calculation result of Equation 1.

Alternatively, when SOC is obtained by integrating a current flowing in and out of the unit cell 111, results obtained by converting the SOC calculation result to OCV in the SOC table 181 of FIG. 3 can be used. In FIG. 5, as an example, the SOC of the unit cell 111 is used as an input.

$$\text{Unit cell allowable charge current} = (V\text{max OCV})/\text{internal resistance value} \quad \text{(Equation 2)}$$

$$\text{Unit cell allowable discharge current} = (\text{OCV } V\text{min})/\text{internal resistance value} \quad \text{(Equation 3)}$$

Although not illustrated, the unit cell allowable charge current 152 and the unit cell allowable discharge current 153 are obtained at each of the highest temperature and the lowest temperature of the unit cell 111, and the smaller one is finally adopted.

Figure 6:
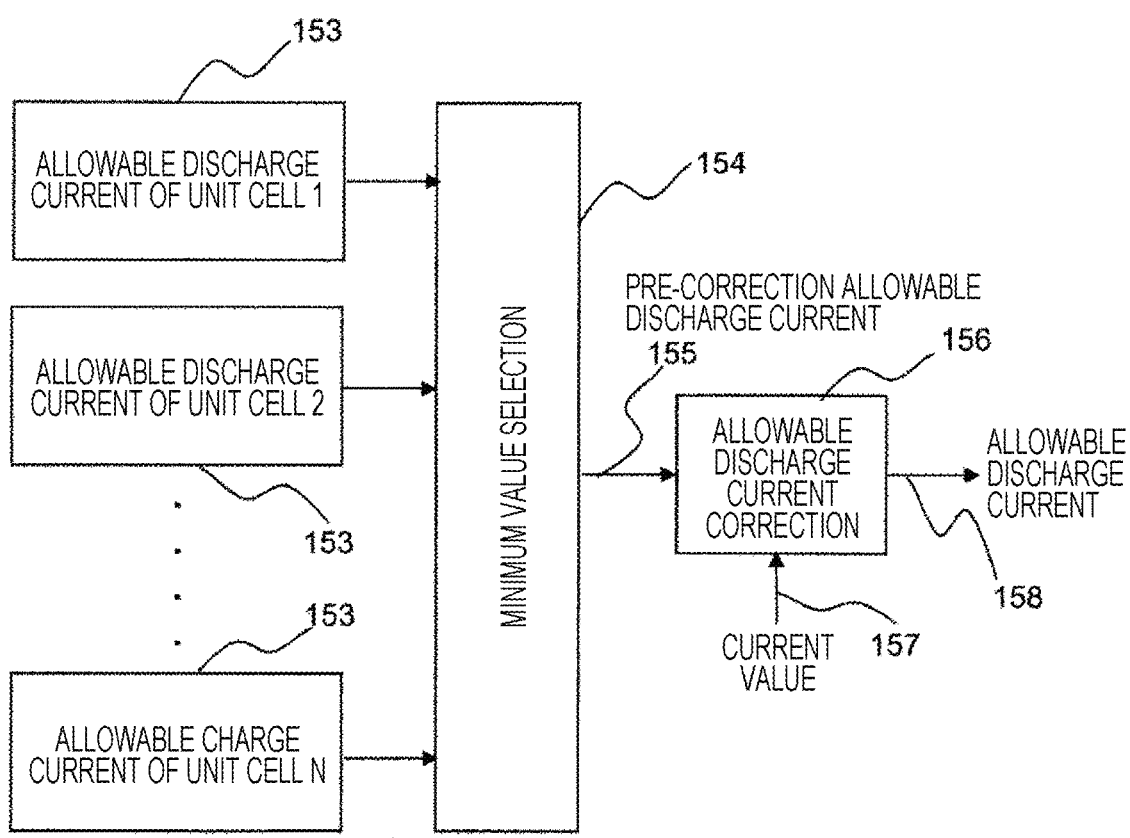
FIG. 6 indicates a control block representing a method of obtaining an allowable discharge current of a battery pack 110 of the battery pack controller 150 of the battery system 100.

FIG. 6 is a diagram indicating, by a control block, a method of obtaining the allowable discharge current 158 of the battery pack 110 of the battery pack controller 150 included in the battery system 100. In addition to the method described with reference to FIG. 5, the battery pack controller 150 calculates the allowable discharge current 153 for each unit cell 111 by inputting the SOC of each unit cell 111. Then the smallest discharge current is selected from the minimum value selection 154, and a pre-correction allowable discharge current 155 is generated. Further, the allowable discharge current correction 156, which is a feature of the present embodiment, is performed to finally generate the allowable discharge current 158. The allowable discharge current correction 156 corrects the pre-correction allowable discharge current 155 mainly based on the current value 157 which is an output of the current detector 130 to generate the allowable charge current 158. A specific correction method will be described later.

Since the currents flowing through all the series-connected unit cells 111 are the same, by adopting the smallest unit cell allowable discharge current 153 among the unit cells 111 as the pre-correction allowable discharge current 155, discharge control can be realized in which voltages of all the unit cells 111 do not exceed Vmin.

The battery pack discharge voltage at the time of discharge is calculated using the allowable discharge current 158 of the battery pack 110, and the allowable discharge current 158 and the battery pack discharge voltage are multiplied. Thereby allowable discharge power of the battery pack 110 can be calculated.

The battery pack discharge voltage is a total voltage of the battery pack 110 that is expected when energizing the finally determined allowable discharge current. The battery pack discharge voltage may be the sum of the voltages of the unit cells 111 in the case of charging with the allowable discharge current obtained by inputting such as SOC and temperature for each unit cell 111 constituting the battery pack 110 and may be the result obtained by multiplying the average voltage of the unit cells 111 by a serial number in the case of charging with the allowable discharge current obtained by inputting the average SOC and the average temperature of the unit cells 111 constituting the battery pack 110.

A method of calculating the total voltage value by obtaining the voltage for each of the unit cells 111 described above and a method of obtaining the average voltage of the unit cells 111 and multiplying the average voltage by a serial number may be adopted. In the present embodiment, the method of obtaining the average voltage of the unit cells 111 and multiplying the average voltage by a serial number is adopted. The method will be described using the following equation (4).

The average OCV in the following equation 4 uses a result obtained by converting the average value of calculation results of equation 1 for each unit cell 111 or the average value of the SOC of the current integration obtained for each unit cell 111 to the average OCV by the SOC table 181 in FIG. 3. The average internal resistance value in the following equation 4 is obtained by inputting the average value of the SOC for each unit cell 111 obtained by using equation 1 and FIG. 3 or the SOC of the current integration for each unit cell 111, the average value of a plurality of temperatures measured from the battery pack 110, and a discharging duration time to the internal resistance table 182 of FIG. 4.

Battery pack discharge voltage=serial number×(average OCV+allowable discharge current×average internal resistance value)   (Equation 4)

Allowable discharge power=allowable discharge current×battery pack discharge voltage   (Equation 5)

The battery pack controller 150 sends a command to the inverter 400 and the like so as to execute a series of calculations up to the above-described allowable charge power, transmit the calculation result to the vehicle controller 200, and charge the battery pack 110 within the range of the allowable discharge power received by the vehicle controller 200. In this manner, it is possible to discharge the battery pack 110 within a range in which none of the unit cells 111 constituting the battery pack 110 falls below Vmin.

An operation example of the allowable discharge current correction 156, which is a feature of the present embodiment, will be described below with reference to FIGS. 7 to 11.

Figure 7:
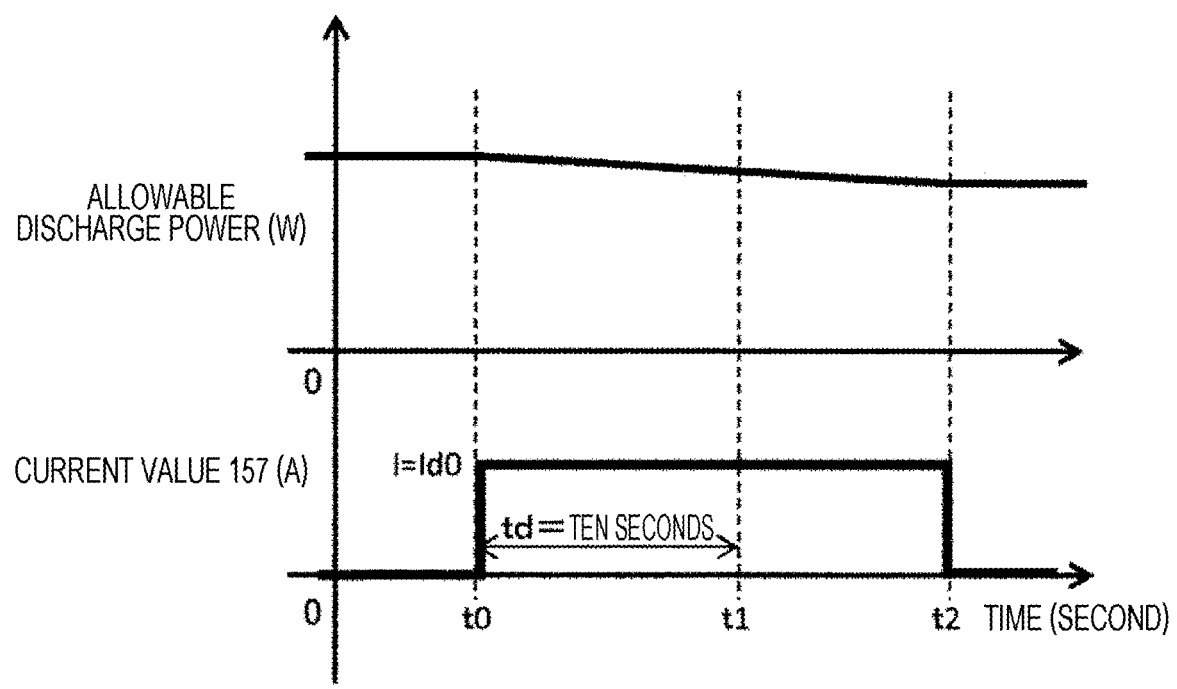
FIG. 7 indicates a time transition of a current value 157 to which the present invention is not applied and the allowable discharge power transmitted to a vehicle controller 200.

FIG. 7 is a comparative example to which the present embodiment is not applied and indicates a time transition of the current value 157 and the allowable discharge power calculated based on the allowable discharge current 158 and transmitted to the vehicle controller 200 based on the allowable discharge current 158 when the allowable discharge current correction 156 does not correct anything (in this case, the allowable discharge current 158 is equal to the pre-correction allowable discharge current 155).

In this example, the current value 157 is initially zero, the current I=Id0 flows out from the time t0 and comes to zero again at the time t2. The current value Id0 is a value that is not zero or a charge and can be recognized as a discharge. When the current I=Id0 continuously flows beyond the predetermined discharging duration time td (here assumed to be ten seconds), as described above, since the internal resistance value changes according to the discharging duration time td, a deviation occurs from the internal resistance table held in the storage unit 180.

This example corresponds to the case where the current value 157 has passed the predetermined discharging duration time td. When the allowable discharge current correction 156 is not operated, the allowable discharge power transmitted to the vehicle controller 200 does not change greatly even if the current flowing time exceeds the time t1 which is the predetermined discharging duration time td. This is because the pre-correction allowable discharge current 155, which is the basis of the allowable discharge current, is determined by SOC and temperature as described above.

At this time, since the vehicle controller 200 refers to the allowable discharge power communicated with little change, it is determined that the current vehicle drive can be continued. However, the current flows beyond the predetermined discharging duration time td, and the actual internal resistance value is larger than that in the internal resistance table held in the storage unit 180. In this state, the allowable discharge power obtained by (Equation 3), (Equation 4), and (Equation 5) is a value larger than the actually allowable power value. As a result, when the vehicle controller 200 discharges in accordance with the obtained allowable discharge power, the storage battery is used beyond an allowable discharge. Therefore, there is a risk of overloading the storage battery and causing deterioration.

Figure 8:
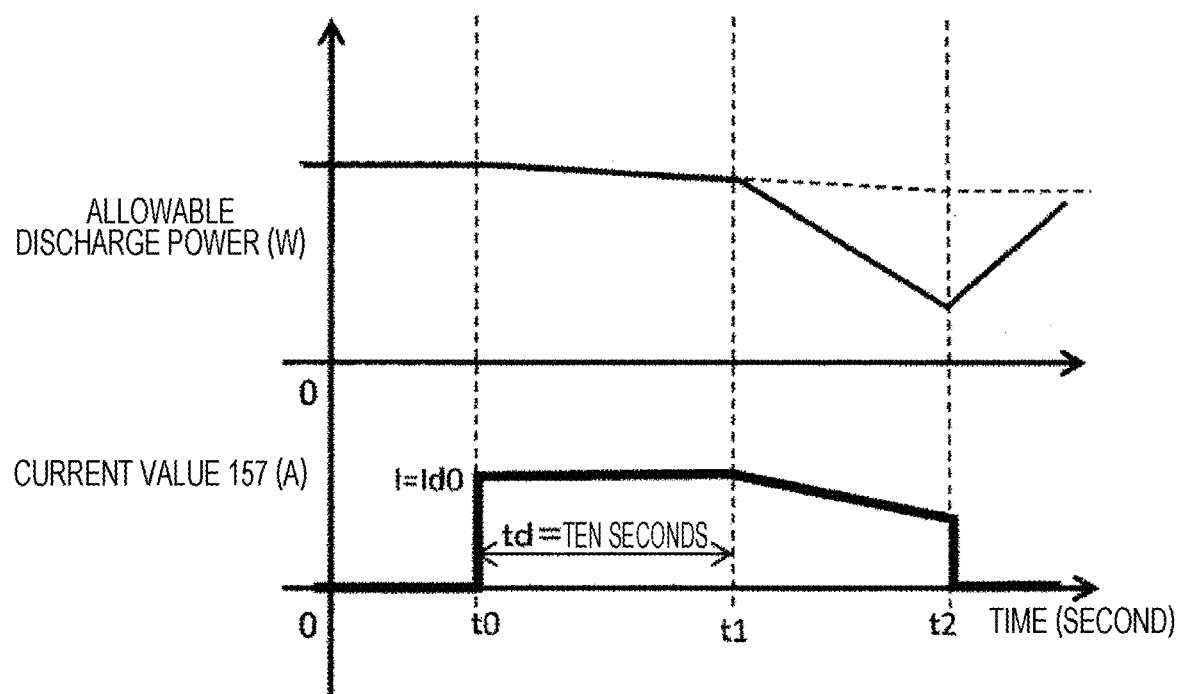
FIG. 8 indicates a time transition of the current value 157 according to an embodiment of the present invention and the allowable discharge power transmitted to the vehicle controller 200.

On the other hand, FIG. 8 is a diagram indicating a time transition of the current value 157 and the allowable discharge power calculated based on the allowable discharge current 158 and transmitted to the vehicle controller 200 in the case of operating the allowable discharge current correction 156 which is a feature of the present embodiment. This example indicates the case where the current value 157 is initially zero, the current I=Id0 flows from the time t0, exceeds the time t1 at which the current flowing period becomes the predetermined discharging duration time td, and becomes substantially zero again at the time t2. However, the difference from FIG. 7 is that the current value 157 gradually decreases due to the effect of this embodiment between time t1 and time t2.

The operation of the allowable discharge current correction 156 which is an embodiment of the present embodiment is performed as follows. At the time t1, the allowable discharge current correction 156 detects that the current I=Id0 continues to flow for a predetermined discharging duration time td according to the information of the input current value 157, and the allowable discharge current 158 begins to decrease. As a result, as indicated in FIG. 8, the allowable discharge power transmitted to the vehicle controller 200 starts to decrease from time t1. The vehicle controller 200 performs vehicle drive control so as not to exceed the allowable discharge power by referring to the transmitted decreasing allowable discharge power and comparing with the discharge power actually consumed by a vehicle. As a result, deterioration of the storage battery is suppressed since the current value 157 decreases.

Further, in this example, the vehicle controller 200 stops input/output of the storage battery at the time t2 and sets the current value 157 to zero. At this time, the allowable discharge current correction 156, which is an embodiment of the present embodiment, is increased so as to return the allowable discharge current 158 to the original pre-correction allowable discharge current 155 from time t2. When the storage battery is a lithium ion battery, a carrier of electric charge inside the battery is lithium ion. When energization of the storage battery is terminated, distribution of unevenly distributed ions inside the battery begins to reduce, and internal resistance is expected to decrease. Therefore it is possible to gradually return the allowable discharge power to the original value.

FIG. 8 and the above description show the correction process of the allowable discharge current 158 by the allowable discharge current correction 156 which is an example of the present embodiment and the change of the allowable discharge power transmitted to the vehicle controller 200 based on the process. Although only the process related to the discharge of a storage battery is described here, the same process may be executed to suppress deterioration of the storage battery even during charging. Although illustration and detailed description are omitted, the scope of the present embodiment includes performing the allowable charge current correction by similarly defining a predetermined charging duration time tc related to charging.

Second Embodiment

Figure 9:
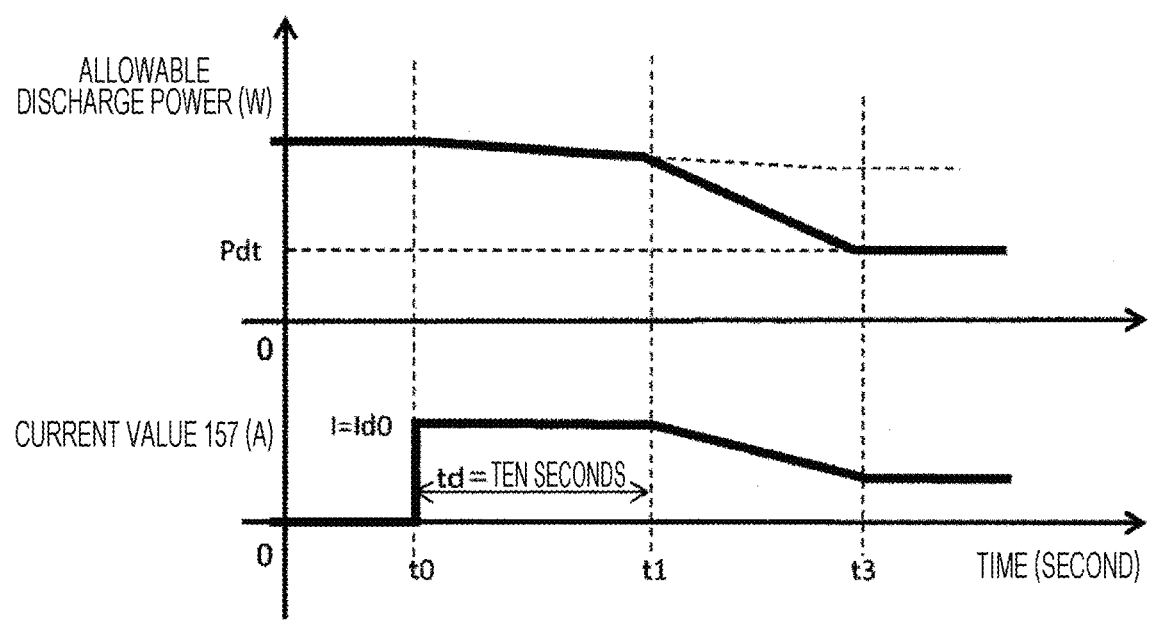
FIG. 9 indicates a time transition of the current value 157 according to an embodiment of the present invention and the allowable discharge power transmitted to the vehicle controller 200.

FIG. 9 is an example indicating a time transition of a current value 157 and the allowable discharge power calculated based on an allowable discharge current 158 and transmitted to a vehicle controller 200 in the case of operating an allowable discharge current correction 156 which is a feature of the present embodiment. The embodiment indicated in FIG. 9 differs from the embodiment indicated in FIG. 8 in that a current continues to flow without stopping the discharge after time t1.

The operation of the allowable discharge current correction 156 which is an example of the present embodiment is performed as follows. At time t1, the allowable discharge current correction 156 detects that a current I=Id0 continues to flow for a predetermined discharging duration time td according to the information of the input current value 157, and the allowable discharge current 158 begins to decrease. As a result, as indicated in FIG. 8, the allowable discharge power transmitted to the vehicle controller 200 starts to decrease from time t1.

In this example, it is assumed that the vehicle controller 200 requests discharge of the storage battery to continue operation with the maximum possible power. Therefore, the vehicle controller 200 operates so as to consume power equivalent to decreasing allowable discharge power.

Here, a threshold value Pdt of the allowable discharge current is defined. The threshold value Pdt is a preset constant that means an allowable discharge power value capable of continuously conducting electricity with little deterioration in the storage battery or a function of battery state such as temperature, SOC, and internal resistance.

As the allowable discharge power decreases, the current value 157 also decreases. However, when the allowable discharge power reaches the threshold value Pdt, the allowable discharge current correction 156 stops decreasing the allowable discharge current 158 and allows the threshold value Pdt to be the allowable discharge power and outputs it as the allowable discharge current 158. Thus, it is possible to provide the vehicle controller 200 with the allowable discharge current that minimizes the limitation of the vehicle operation while suppressing deterioration of the storage battery. Further, the threshold value may be set as the allowable discharge current value capable of continuous energization, and the same processing may be performed by comparison with the allowable discharge current 158. Further, in the allowable discharge current correction 156, to stop reducing the allowable discharge current 158, the slope of the decrease of the allowable discharge current 158 may be changed.

In the above description, it has been indicated that a value that can be continuously energized to a storage battery is set as the threshold value Pdt. In addition to this, the scope of the present embodiment includes that, when a phenomenon occurs in which the internal resistance sharply rises when the applied storage battery flows a large current for a long time, a current value or power value at which the phenomenon does not occur is set as a threshold value, and the similar allowable discharge current correction 157 is operated.

Third Embodiment

Figure 10:
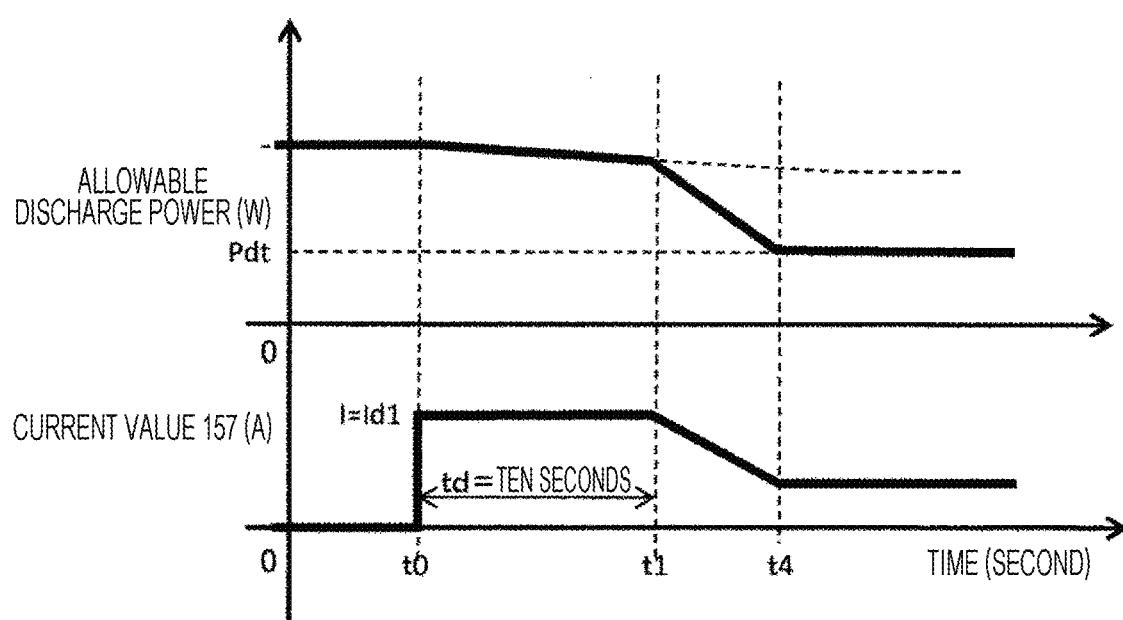
FIG. 10 indicates a time transition of the current value 157 according to an embodiment of the present invention and the allowable discharge power transmitted to the vehicle controller 200.

FIG. 10 is an example indicating a time transition of a current value 157 and the allowable discharge power calculated based on an allowable discharge current 158 and transmitted to a vehicle controller 200 in the case of operating an allowable discharge current correction 156 which is a feature of the present invention. The embodiment of the present invention indicated in FIG. 10 is different from that in FIG. 9 in that the current flowing between time t0 and time t1 is different (Id1>Id0), and the rate at which the allowable discharge current is reduced is different from time t1 (t4−t1<t3−t1).

The allowable discharge current correction 156 detects that the current is continuously flowing during a predetermined discharging duration time td and increases the rate for decreasing the allowable discharge power as the value of the current value 157 at that time increases. The higher the current is, the higher the stress given to a storage battery is, such that the deterioration of the storage battery can be suppressed by accelerating the rate of decrease of the allowable discharge power.

Further, in the present embodiment, the rate of decrease of the allowable discharge power does not change only depending on the magnitude of the current. In addition to the magnitude of the current, the elapsed time of the current, the temperature of a battery, the degree of deterioration of a battery, and the like affect the rate of decrease of the allowable discharge power. The basic policy is to increase the rate of decrease of the allowable discharge power when the storage battery is under further stress. That is, the longer the current elapsed time is, the lower the temperature of a battery is, and the higher the deterioration degree of a battery is, a process of increasing the rate of decrease of the allowable discharge power is performed by the allowable discharge current correction 156.

In a situation where the elapsed time of the current is long, the followability to the allowable discharge power transmitted to the vehicle controller 200 is slow. As a result, it is assumed that the current continuously flows beyond the predetermined discharging duration time td. In addition, both the cases where the battery temperature is low, and the degree of deterioration of the battery is high are in a situation where the internal resistance of the storage battery is higher than the normal temperature or the initial state of the battery, and it is assumed that the degree of stress against flowing current is high.

The scope of the present embodiment includes that, regarding the rate of change of the allowable discharge power, the rate at which the allowable discharge power increases more than the time t2 at which the current value 157 in FIG. 8 comes to zero also varies according to the temperature and degree of deterioration of the battery similarly to the rate of decrease of the allowable discharge power described above. When the temperature of the battery is low, the increase rate is delayed, and when the battery deterioration degree is high, the increase rate is delayed. This makes it possible to appropriately alleviate stress to the battery. In the following fourth embodiment, an example of temporarily charging during discharging is indicated, but an increase process of an allowable discharge power is performed during charging. An increasing rate of the allowable discharge power at this time is changed by the current during charging. Processing to increase the rate of increase of the allowable discharge power is performed as the current at the time of charging increases. This is because uneven distribution of ions in the battery due to discharge is canceled as the charge current increases.

Fourth Embodiment

Figure 11:
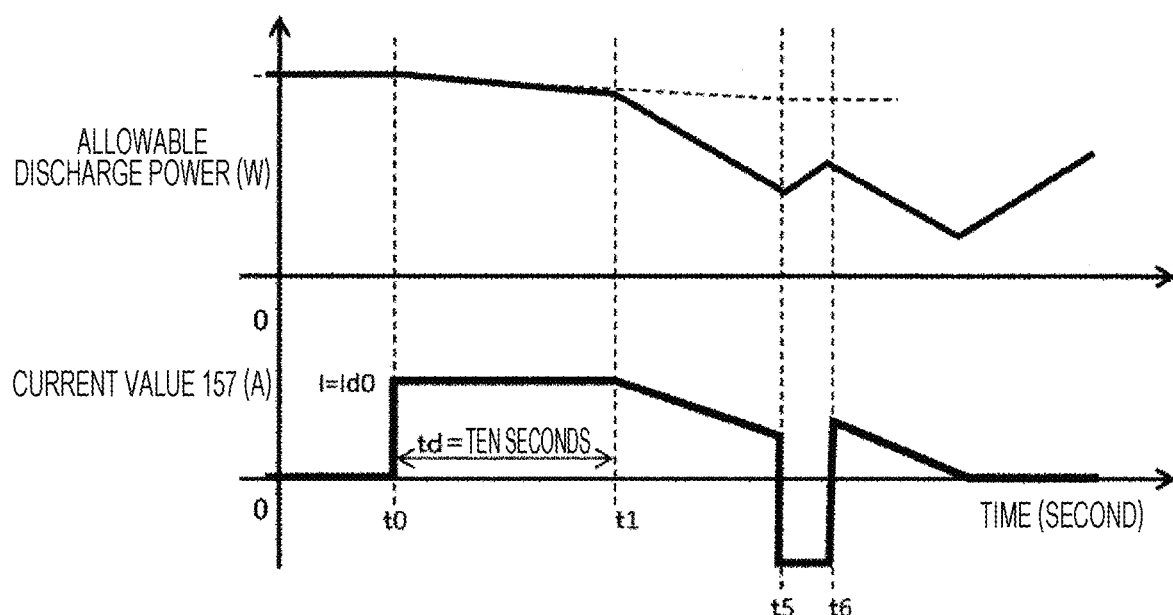
FIG. 11 indicates a time transition of the current value 157 according to an embodiment of the present invention and the allowable discharge power transmitted to the vehicle controller 200.

FIG. 11 is an example indicating a time transition of a current value 157 and the allowable discharge power calculated based on an allowable discharge current 158 and transmitted to a vehicle controller 200 in the case of operating an allowable discharge current correction 156 which is a feature of the present invention. FIG. 11 is different from FIGS. 8 to 10 in that the current direction flowing in the battery changes.

Similarly to the above, at the time t1, the allowable discharge current correction 156 detects that a current I=Id0 continues to flow beyond a predetermined discharging duration time td by the information of the input current value 157 and reduces the allowable discharge current 158. As a result, the allowable discharge power transmitted to the vehicle controller 200 starts to decrease.

In this example, when the allowable discharge current correction 156 reduces the allowable discharge power, for example, the driver applies a brake, the vehicle controller 200 switches the vehicle to a regeneration operation mode in the period from time t5 to time t6 to charge the storage battery with power from a motor. Further, it is defined according to the specification that the current value 157 is a positive value at the time of discharging the battery, and the current value 157 is a negative value at the time of charging.

In an example of the present embodiment, the allowable discharge power is increased during a period in which charging is performed by switching from the discharging state to the charging state while the allowable discharge power is being reduced. Since the distribution state in which ions are unevenly distributed in the battery occurs due to the state change from discharge to charge or vice versa, a reduction in internal resistance is expected, such that the allowable discharge power can be relaxed accordingly.

Furthermore, in the present example, after the charging period from time t5 to time t6, the discharge is restarted, and finally the current is made zero. Since the charging period is short (for example, <10 seconds), the allowable discharge power increases during that period. However, the allowable discharge power is decreased from time t6 at which the discharging restarts. The reduction rate of the allowable discharge power at this time is the same as the conditions from time t1 to time t5. The current comes to zero, and the allowable discharge power increases, due to the same processing and reason described in FIG. 8.

FIG. 11 indicates an operation example of the present invention in the case where the state temporarily changes from the discharged state to the charged state and then the state is changed to the discharged state again. However, in the period (herein referred to as a "charging period") from time t5 to time t6 in which charging is performed, the processing differs depending on how the allowable discharge power changes. Here, a determination time tt is defined. The following three conditions are operating conditions for different processing.

Condition 1 . . . The case where the allowable discharge power is increased during the charging period, but the allowable discharge current 158 does not reach the pre-correction allowable discharge current 155.

Condition 2 . . . The case where the allowable discharge power is increased during the charging period, and the allowable discharge current 158 reaches the pre-correction allowable discharge current 155, but the time from the arrival to the turning to the discharge state again is shorter than the determination time tt.

Condition 3 . . . The case where the allowable discharge power is increased during the charging period, and the allowable discharge current 158 reaches the pre-correction allowable discharge current 155, but the time from the arrival to the turning to the discharge state again is longer than the determination time tt.

Condition 1 is the same as the situation indicated in FIG. 11, and processing is performed to reduce the allowable discharge power at time t6 when the state changes from charging to discharging. Considering that uneven distribution of ions in the battery which has been formed at the time of discharging so far is not eliminated due to the short-time charging, and the state of high internal resistance is maintained, the process of reducing the allowable discharge power which has been performed before time t5 is continuously performed.

Condition 2 is a process of increasing the allowable discharge power during the charging period, and once the allowable discharge current 158 reaches the pre-correction allowable discharge current 155, temporarily stops the process of increasing or decreasing the allowable discharge current. However, if it is considered that the charge time is short and maintains a high internal resistance, as in Condition 1, processing for reducing the allowable discharge power is performed when the state changes to discharging. As an example of the determination, the determination time tt having a predetermined value set in advance is compared with the time from when the allowable discharge current 158 performing the increasing process reaches the pre-correction allowable discharge current 155 to when the state is changed to discharging again. Condition 2 is the case where this time is shorter than the determination time tt, and condition 3 is the case where this time is longer than the determination time tt.

Condition 3 carries out an increase process of the allowable discharge power during the charging period and stops the increase/decrease process of the allowable discharge power when the allowable discharge current 158 reaches the pre-correction allowable discharge current 155. Unlike condition 2, it is considered that since the charging continues for a long time, the influence of the uneven distribution of ions in the battery due to almost charging has been eliminated, and the process of reducing the allowable discharge power is not performed.

The example described with reference to FIG. 11 is an example of the processing of the allowable discharge power in the case of temporarily switching to charging in the middle of discharging. The scope of the present invention includes the processing of the allowable charge power in the case of temporarily turning to discharge in the middle of charging and also the case where the charging and discharging are replaced with each other.

REFERENCE SIGNS LIST

100 battery system
110 battery pack
111 unit cell
112a and 112b unit cell group
120 unit cell management unit
121a and 121b unit cell controller
122 voltage detection circuit
123 control circuit
124 signal input/output circuit
125 temperature detector
130 current detector
140 voltage detector
150 battery pack controller
155 pre-correction allowable discharge current
156 allowable discharge current correction
157 current value
158 allowable discharge current
160 signal communication unit
170 insulation element
180 storage unit
181 SOC table
182 internal resistance table
200 vehicle controller
300 to 330 relay
400 inverter
410 motor generator
420 charger

The invention claimed is:

1. A battery control device, comprising:
   at least one unit cell controller,
   a current detector;
   a voltage detector; and
   a battery pack controller, the battery pack controller communicatively coupled to the at least one unit cell controller, the current detector, and the voltage detector, and configured to calculate an allowable input/output value that is an allowable input/output current or an allowable input/output power that is capable of charging or discharging a battery,
   wherein, in a case where
   charging or discharging is started from a non-energized state of the battery, or
   discharging is started from a state where the battery is already charged, or
   charging is started from a state where the battery is already discharged, and
   the started charging or discharging continues even after the lapse of a predetermined period,
   based on the time during which the charging or discharging continues, the battery control device reduces the allowable input value obtained by the battery pack controller when the current polarity flowing through the battery is charge and reduces the allowable output value obtained by the battery pack controller when the current polarity is discharge.

2. The battery control device according to claim 1,
   wherein in a case where the current flowing through the battery becomes substantially zero when the allowable input value or the allowable output value is decreasing based on the time during which the charging or discharging is continued,
   the allowable input value or the allowable output value changes from the decrease to an increase.

3. The battery control device according to claim 1,
   wherein when the allowable input value or the allowable output value is decreasing based on the time during which the charging or the discharging is continued and when the allowable input value or the allowable output value decreases to a predetermined value,
   the slope of decrease of the predetermined value is changed.

4. The battery control device according to claim 3,
   wherein the predetermined value is set based on at least one of temperature, SOC, and internal resistance of the battery.

5. The battery control device according to claim 1,
   wherein, based on the value of current flowing through the battery during the predetermined period, the rate of decrease of the allowable input value or the allowable output value is changed.

6. The battery control device according to claim 1,
   wherein in a case where
   the state of the battery is switched from discharge to charge
   when the allowable input value or the allowable output value is decreasing based on the time during which the charging or discharging is continued
   the allowable output value changes from the decrease to an increase, or
   in a case where the state of the battery is switched from charge to discharge, the allowable input value changes from the decrease to an increase.

7. The battery control device according to claim 1, wherein the at least one unit cell controller includes a voltage detection circuit, a control circuit, an input/output circuit and a temperature detector.

* * * * *